May 9, 1950     F. J. WIEGAND ET AL     2,507,075
RATE OF FLOW DIFFERENTIAL PRESSURE COMBINING DEVICE
Filed Dec. 7, 1945
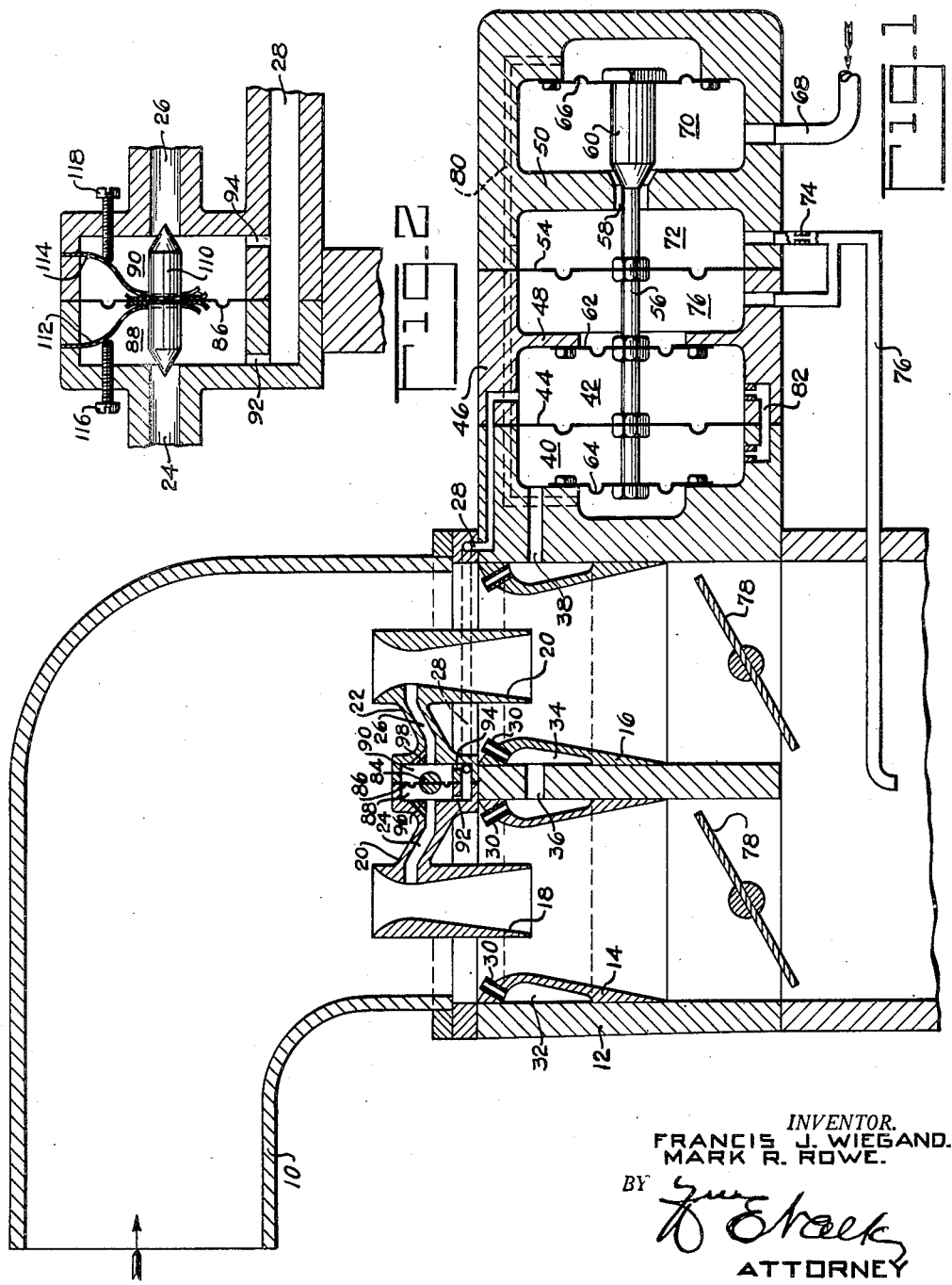
INVENTOR.
FRANCIS J. WIEGAND.
MARK R. ROWE.
BY
ATTORNEY Patented May 9, 1950

2,507,075

UNITED STATES PATENT OFFICE 2,507,075

RATE OF FLOW DIFFERENTIAL PRESSURE COMBINING DEVICE

Francis J. Wiegand, Ridgewood, and Mark R. Rowe, West Englewood, N. J., assignors to Wright Aeronautical Corporation, a corporation of New York Application December 7, 1945, Serial No. 633,562

7 Claims. (Cl. 73—213)

This invention relates to flow measuring means and is particularly directed to means for measuring flow in a duct in which there is likelihood of a non-uniform distribution of flow across the duct.

Venturi measuring system for measuring the air flow through the intake duct of an internal combustion engine have comprised a pair of spaced Venturi tubes disposed in said duct. The two Venturi throat pressures are transmitted to a common passage and the pressure difference between the resultant of the throat pressures and the average impact pressure has been used as a measure of the air flow through the duct. However, assuming that the average velocity across the duct is approximately equal to the arithmetic average of the fluid velocities at the entrance to each Venturi tube, then the aforementioned pressure difference is not an accurate measure of the average flow through the duct. This is so since the flow through a Venturi tube is not proportional to the Venturi pressure differential and, instead, is proportional to the square root of the Venturi pressure differential. As a result, if the resultant pressure differential of the two Venturi tubes is to be an approximate measure of the average air flow, this pressure differential should be approximately proportional to the square of the arithmetic average of the square roots of the individual pressure differentials of each Venturi tube. Actually, however, when the throat pressures of the two Venturi tubes are transmitted to a common passage, the resulting pressure differential is approximately equal to the arithmetic average of the two Venturi pressure differentials and, in general, this resulting pressure differential is greater than the aforementioned desired pressure differential.

Accordingly, it is an object of this invention to provide means for combining the pressure differentials obtained from two Venturi tubes in a common fluid flow duct such that the square root of the resulting pressure differential is proportional to the average flow through the duct. Specifically, the invention comprises a valve which is arranged to throttle the larger of the two Venturi suction pressures. In this way, the resultant pressure differential obtained from the combination of the two Venturi pressure differentials can be made to closely approximate the proper value for the average flow through the duct.

Other objects of this invention will become apparent upon reading the annexed detailed description in connection with the drawing in which:

Figure 1 is a diagrammatic sectional view illustrating one embodiment of the invention; and Figure 2 is a sectional view of a modified form of a portion of Figure 1.

Referring to Figure 1, 10 designates an air intake duct for an internal combustion engine across which the air flow tends to be non-uniform—for example, because of the bend illustrated in this duct. A section 12 of the duct is provided with a pair of side-by-side main Venturi tubes 14 and 16 through which passes all the air flowing through the duct. The main Venturi tube 14 is provided with a boost Venturi tube 18 and the main Venturi tube 16 is provided with a boost Venturi tube 20. The boost Venturi tubes 18 and 20 are supported from the duct section 12 by the arms 20 and 22 respectively. Passages 24 and 26 within the arms 20 and 22 open into the throats of the Venturi tubes 18 and 20 respectively and communicate with a common passage 28.

The impact pressure of the air entering the main and boost Venturi tubes is transmitted through tubes 30 to the annuli 32 and 34 provided by the main Venturi tubes 14 and 16 respectively. These annuli are connected together by the passage 36 and the pressure therein is transmitted to a passage 38. The passages 28 and 38 are in communication with chambers 40 and 42 on opposite sides of a diaphragm 44 supported by and extending across a housing 46. In this way, the diaphragm 44 is subjected to a pressure difference which is a function of the magnitude of the air flow through the duct 10.

The housing 46 is also provided with fixed partitions 48 and 50 and a flexible diaphragm 54 extending thereacross. The flexible diaphragms 44 and 54 are connected together for joint movement by a valve stem 56. The valve stem extends through an opening 58 in the fixed partition 50 and has a valve head 60. A small flexible diaphragm 62 provides a seal between the valve stem 56 and the fixed partition 48 and small flexible diaphragms 64 and 66 provide seals at the ends of the valve stem. Fuel under pressure is supplied from a conduit 68 to a chamber 70 from which it flows through the valve opening 58 into a chamber 72. From the chamber 72, the fuel flows through a restricted orifice 74 in the conduit 76 from which it discharges into the air duct 10 below the throttle valves 78. The fuel pressure downstream of the orifice 74 is transmitted to a chamber 76 whereby the flexible diaphragm 54 is subjected to a fuel pressure differential substantially proportional to the fuel flow. The remote sides of the small flexible diaphragms 64 and 66 are placed in communication with each other and to a suitable source of pressure through a passage 80. With this construction, the diaphragms 44 and 54 position the fuel valve 60 so that the air pressure differential across the diaphragm 44 balances the fuel pressure differential across the diaphragm 54. In this way, the magnitude of the fuel flow to the internal combustion engine is controlled by the magnitude of the air flow. The structure so far described is quite conventional and the particular manner in which the air flow pressure differential controls the fuel flow forms no part of the present invention. It is also common practice to provide a restricted bleed passage 82 around the diaphragm 44.

With the present invention, the air pressure in the chamber 42 is automatically controlled by a spherical member 84 supported by a flexible diaphragm 86. The diaphragm 86 extends across a housing to provide a pair of chambers 88 and 90 into which open the passages 24 and 26 respectively. The member 84 is movable with the diaphragm 86 to control the air flow from the chambers 88 and 90 into the passages 24 and 26. Accordingly the member 84 comprises a flow restrictor which upon movement toward the passage 24 restricts the flow through said passage from the chamber 88 relative to the flow through passage 26 from the chamber 90, while movement of said member 84 toward the passage 26 restricts the flow through the passage 26 relative to that through the passage 24. In addition, the chambers 88 and 90 are in communication with the passage 28 through restricted openings 92 and 94 respectively.

With this construction, during engine operation, there is a continual flow of air from the impact tubes 30, passage 38, chamber 40, restricted bleed passage 82, chamber 42 to the passage 28. From the passage 28, this air flow divides through the two restrictions 92 and 94 into chambers 88 and 90 and thence into passages 24 and 26 to the throats of the two Venturi tubes 18 and 20 respectively. Assuming that the restrictions 92 and 94 are the same then if there is any difference in the Venturi throat pressures—for example, if the throat pressure of the Venturi tubes 18 is less than the throat pressure of the Venturi tube 20—there will be a larger air flow through the restriction 92 into the chamber 88 to the Venturi tube 18 than the air flow through the restriction 94 into the chamber 90 to the Venturi tube 20. This result follows from a smaller pressure in the chamber 88 than in the chamber 90 so that the diaphragm 86 will move the member 84 to the left to throttle the air flowing from the chamber 88 to the Venturi tube 18 until the pressures balance on the two sides of the diaphragm 86.

In this way, the valve 84 automatically decreases the air pressure differential across the diaphragm 44 from what it would be in the absence of the member 84 and the extent to which the pressure differential is decreased depends on the extent to which the air flow through the Venturi tubes 18 and 20 is unequal.

If desired, the relative effect of the pressure differences of the two Venturi tubes on the pressure differential across the diaphragm 44 may be modified by providing small by-pass passages 96 and 98 respectively around the ends of the passages 24 and 26 controlled by the member 84. Said by-pass passages may be made adjustable. In addition, the pressure differential across the diaphragm 44 may be changed by varying the relative size of the restrictions 92 and 94. Also, spring means may be provided to urge the valve 84 toward the passage 24 or 26. These features may be used singly or in combination and in this way the pressure differential across the diaphragm 44 can be made to be an accurate measure of the average air flow through the duct 10.

Figure 2 illustrates a modification in which the aforementioned springs have been added to the valve. In this modification, a needle type valve 110 has been illustrated instead of the spherical member 84 of Figure 1. However, the particular shape of the member forms no part of the present invention. Figure 2 is otherwise similar to Figure 1 and like parts have been indicated by like reference numerals. In Figure 2, springs 112 and 114 act against the diaphragm 86 whereby the member 110, carried by the diaphragm, is urged to the right or left by the springs depending on their relative adjustment by the screws 116 and 118. Accordingly, the pressure difference across the diaphragm 44 may be varied by adjusting the screws 116 and 118. In Figure 2, if the springs 112 and 114 are adjusted to bias the member 110 in one direction or the other, the valve 110 will not maintain equal pressures within the chambers 88 and 90, but it will maintain a predetermined relation between these pressures as determined by the adjustment of the springs.

As used in the specification and in the appended claims, a Venturi tube is a tube open at both ends with a minimum internal-diameter throat portion intermediate the ends of the tube, said tube being disposed for continuous flow therethrough of at least a portion of the fluid whose flow is to be measured.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In a flow measuring system: a duct through which a fluid is arranged to flow; first and second spaced Venturi tubes disposed within said duct; a housing; a movable member dividing said housing into first and second chambers; means providing a first passageway having one end opening into the throat of said first Venturi tube and having its other end communicating with said first chamber; means providing a second passageway having one end opening into the throat of said second Venturi tube and having its other end communicating with said second chamber; means providing a third passageway communicating with both of said chambers; said member being movable in response to changes in the pressure in one of said chambers, relative to the pressure in the other of said chambers, for controlling flow of said fluid through said first and second passageways and their respective chambers from said third passageway.

2. In a flow measuring system, a duct through which a fluid is arranged to flow; first and second spaced Venturi tubes disposed within said duct; means providing first, second, and third passageways; said first passageway having one end opening into the throat of said first Venturi tube and said second passageway having one end opening into the throat of said second Venturi tube, said third passageway communicating with the other ends of said first and second passageways; and means arranged to automatically control flow of said fluid through said first and second passageways for regulating the pressure in said third passageway relative to the throat pressures of said two Venturi tubes.

3. In a flow measuring system: a duct through which a fluid is arranged to flow; first and second laterally spaced Venturi tubes disposed within said duct; a housing; a movable member dividing said housing into first and second chambers; means providing a first passageway having one end opening into the throat of said first Venturi tube and having its other end communicating with said first chamber; means providing a second passageway having one end opening into the throat of said second Venturi tube and having its other end communicating with said second chamber; means providing a third passageway communicating at one end with both of said chambers and at its other end with said duct; and means movable by said member in response to an increase in the pressure in one of said chambers, relative to the pressure in the other of said chambers, for decreasing the flow of said fluid from said third passageway through said other chamber and that one of said first and second passageways communicating with said other chamber.

4. In a flow measuring system: a duct through which a fluid is arranged to flow; first and second laterally spaced Venturi tubes disposed within said duct; a housing; a movable member dividing said housing into first and second chambers; means providing a first passageway having one end opening into the throat of said first Venturi tube and having its other end communicating with said first chamber; means providing a second passageway having one end opening into the throat of said second Venturi tube and having its other end communicating with said second chamber; means providing a third passageway in restricted communication with both said chambers; and means movable by said member in response to an increase in the pressure in one of said chambers, relative to the pressure in the other of said chambers, for increasing the resistance to flow of said fluid from said other chamber to that one of said first and second passageways communicating with said other chamber.

5. In a flow measuring system: a duct through which a fluid is arranged to flow; first and second laterally spaced Venturi tubes disposed within said duct; a housing; a member dividing said housing into first and second chambers; means providing a first passageway having one end opening into the throat of said first Venturi tube and having its other end communicating with said first chamber; means providing a second passageway having one end opening into the throat of said second Venturi tube and having its other end communicating with said second chamber; means providing a third passageway communicating with one of said chambers through a first restricted opening and communicating with the other of said chambers through a second restricted opening; and means movable by said member in response to an increase in the pressure in one of said chambers, relative to the pressure in the other of said chambers, for increasing the resistance to flow of said fluid from said other chamber to that one of said first and second passageways communicating with said other chamber.

6. The combination recited in claim 5 in which said third passageway is in restricted communication with said duct for fluid flow from said duct into said chambers.

7. In a flow-measuring system: a duct through which a fluid is arranged to flow; first and second laterally spaced Venturi tubes disposed within said duct; a housing; a member dividing said housing into first and second chambers; means providing a first passageway having one end opening into the throat of said first Venturi tube and having its other end communicating with said first chamber; means providing a second passageway having one end opening into the throat of said second Venturi tube and having its other end communicating with said second chamber; means providing communication between said duct and said chambers; said last-mentioned means including a third chamber in communication with said duct and a fourth chamber in restricted communication with said third chamber and communicating with said first and second chambers through first and second restricted openings respectively; and means movable by said member in response to an increase in the pressure in one of said first and second chambers relative to the pressure in the other of said first and second chambers, for increasing the resistance to flow of said fluid from said other chamber to that one of said first and second passageways communicating with said other chamber.

FRANCIS J. WIEGAND.
MARK R. ROWE.

REFERENCES CITED

The following references are of record in the file of this patent:

UNITED STATES PATENTS

| Number | Name | Date |
|---|---|---|
| 1,087,929 | Dodge | Feb. 24, 1914 |
| 1,897,174 | MacLean et al. | Feb. 14, 1933 |
| 1,948,044 | Myers et al. | Feb. 20, 1934 |
| 2,024,059 | Parker et al. | Dec. 10, 1935 |

FOREIGN PATENTS

| Number | Country | Date |
|---|---|---|
| 240,870 | Great Britain | Oct. 5, 1925 |
| 433,549 | Germany | Sept. 2, 1926 |